(12) United States Patent
Lee et al.

(10) Patent No.: US 7,173,114 B2
(45) Date of Patent: Feb. 6, 2007

(54) LIGHTFAST COLORANT AND LIGHTFAST INK COMPOSITION INCLUDING THE SAME

(75) Inventors: Kyung-hoon Lee, Gyeonggi-do (KR); Seung-min Ryu, Gyeonggi-do (KR); Yeon-Kyoung Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 10/772,286

(22) Filed: Feb. 6, 2004

(65) Prior Publication Data

US 2004/0158050 A1   Aug. 12, 2004

(30) Foreign Application Priority Data

Feb. 8, 2003   (KR) .................... 2003-7996

(51) Int. Cl.
*C09B 1/22*   (2006.01)
*C09B 43/124*   (2006.01)
*C09B 43/20*   (2006.01)
*C09B 43/22*   (2006.01)
*C09D 11/00*   (2006.01)

(52) U.S. Cl. ............ 534/793; 534/810; 534/812; 534/829; 534/860; 552/212; 106/31.44; 106/31.5; 106/31.51; 106/31.52; 106/31.75; 106/31.79; 106/31.8; 106/31.81

(58) Field of Classification Search ............ 534/793, 534/810, 812, 829, 860; 552/212; 106/31.44, 106/31.5, 31.51, 31.52, 31.75, 31.79, 31.8, 106/31.81

See application file for complete search history.

(56) References Cited

U.S. PATENT DOCUMENTS

| | | | |
|---|---|---|---|
| 4,273,926 A | | 6/1981 | Frishberg |
| 4,552,951 A | * | 11/1985 | Gourley .................. 534/770 |
| 4,552,952 A | * | 11/1985 | Gourley .................. 534/782 |
| 4,554,348 A | * | 11/1985 | Gourley .................. 534/768 |
| 4,593,087 A | * | 6/1986 | Gourley .................. 534/784 |
| 4,593,088 A | * | 6/1986 | Gourley .................. 534/768 |
| 5,387,262 A | | 2/1995 | Nelson |
| 5,876,492 A | | 3/1999 | Malhotra et al. |
| 5,922,117 A | | 7/1999 | Malhotra et al. |

\* cited by examiner

*Primary Examiner*—Fiona T. Powers
(74) *Attorney, Agent, or Firm*—Staas & Halsey LLP

(57) ABSTRACT

A lightfast colorant and a lightfast ink composition including the lightfast colorant utilize a lightfast colorant that is derived by covalently binding a cinnamate derivative and a conventional colorant. The lightfast colorant improves storage stability as well as lightfastness when added to an ink composition.

12 Claims, No Drawings

LIGHTFAST COLORANT AND LIGHTFAST INK COMPOSITION INCLUDING THE SAME

CROSS-REFERENCE TO RELATED APPLICATIONS

This application claims the priority of Korean Patent Application No. 2003-7996, filed on Feb. 8, 2003, in the Korean Intellectual Property Office, the disclosure of which is incorporated herein in its entirety by reference.

BACKGROUND OF THE INVENTION

1. Field of the Invention

The present invention relates to a lightfast colorant and a lightfast ink composition including the same, and more particularly, to a lightfast colorant that is derived by chemically binding a cinnamate derivative to the molecular structure of a conventional colorant and a lightfast ink composition comprising the same.

2. Description of the Related Art

Ink-jet printing, which is a kind of non-impact printing, has the advantages of low noise generation, compared to impact printing, and effective color printing realization, compared to laser beam printing.

There are two types of non-impact printing: continuous ink-jet printing and drop-on-demand (DOD) printing. In continuous ink-jet printing, while ink is continuously discharged, a change in an electromagnetic field is induced to control a direction in which the ink is jetted. DOD printing, in which micro droplets of ink are jetted, includes thermal-bubble ink-jet printing and piezoelectric ink-jet printing. In thermal-bubble ink-jet printing, ink is discharged by a pressure generated by the swelling of bubbles that are generated as the ink is heated. In piezoelectric ink-jet printing, ink is discharged by a pressure generated by using a piezoelectric plate that is deformed mechanically by electricity.

Recently, a dot-size of ink-jet printers has become smaller and there has been an increasing need for high-resolution, high-quality prints. Smaller dot-size ink-jet printers require a head having smaller nozzle orifices. However, smaller nozzle orifices may become clogged by precipitates, and thus, affect the size of the ink droplets and a performance of the printer. Clearly, the composition of the ink affects the clogging of the nozzle orifices. For this reason, a wetting agent is commonly added to ink-jet ink compositions.

An ink composition for ink-jet printing basically comprises a colorant, a solvent, and an additive. A dye or a pigment may be used as the colorant. However, the use of a dye as the colorant is limited because the dye imparts an inferior lightfast property to a print. When a pigment is used as the colorant, a resulting print is more lightfast than when a dye is used, but the print is still subject to a color change or discoloration when exposed to ultraviolet (UV) light. An additional lightfastness enhancer may be used. However, negative side effects, for example, the clogging of the nozzle orifices by agglomerated ink, the formation of a heterogeneous ink composition, and the like, occur when the lightfastness enhancer is used.

SUMMARY OF THE INVENTION

The present invention provides a lightfast colorant that has minimal negative effects on an ink composition.

The present invention also provides a lightfast ink composition that comprises the lightfast colorant.

In one aspect of the present invention, a lightfast colorant is a cinnamate derivative of formula (1) below:

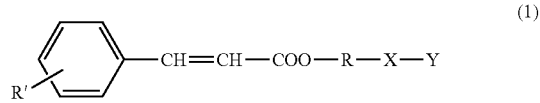

(1)

where R' is selected from the group consisting of a halogen atom, a nitro group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ oxycarbonylalkyl group, a substituted or unsubstituted $C_6$–$C_{18}$ aryl group, and a substituted or unsubstituted $C_7$–$C_{19}$ alkylaryl group; R is selected from the group consisting of a substituted or unsubstituted $C_1$–$C_{30}$ alkylene group, a substituted or unsubstituted $C_1$–$C_{30}$ alkenylene group, a substituted or unsubstituted $C_1$–$C_{30}$ alkynylene group, a substituted or unsubstituted $C_1$–$C_{30}$ heteroalkylene group, a substituted or unsubstituted $C_6$–$C_{30}$ arylene group, a substituted or unsubstituted $C_7$–$C_{30}$ arylenealkylene group, a substituted or unsubstituted heteroarylene group, and a substituted or unsubstituted $C_4$–$C_{30}$ heteroarylenealkylene group; X is a linker selected from the group consisting of —CONH—, —NHCO—, —COO—, —OCO—, —CO—, —SO$_2$—, —SO$_3$—, —O—P(=O)(OH)—O—, and —O—P(OH)—O—; and Y is a colorant residue.

According to an embodiment of the present invention, the colorant residue Y is a remaining moiety of a lightfast colorant, which may be either a dye or a pigment, the moiety excluding the linker X that is an amide bond, an ester bond, a carbonyl bond, a sulfonyl bond, or the like, and which links the colorant and a cinnamate derivative. The linker X is formed by a condensation reaction between a functional group in the molecular structure of the colorant (dye or pigment), such as a hydroxy group, an amino group, a sulfonic acid group, a phosphoric acid group, or the like, and a functional group of the cinnamate derivative such as a carboxyl group, a hydroxy group, or the like.

In another aspect of the present invention, a lightfast ink composition includes at least one lightfast colorant having formula (1) above and an aqueous medium.

In another embodiment of the present invention, a lightfast ink composition may include: a colorant; at least one lightfast colorant having formula (1) above; and an aqueous medium.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the embodiments of the present invention. Embodiments of a lightfast colorant and an ink composition that includes the lightfast colorant according to embodiments of the present invention will be described in detail.

A lightfast colorant according to an embodiment of the present invention is derived by chemically binding a lightfastness enhancer and a colorant. In other words, a lightfast colorant according to an embodiment of the present invention is obtained by chemically binding a conventional colorant and a cinnamate derivative. The lightfast colorant according to an embodiment of the present invention improves the long-term storage stability of an ink composition without a need to add a separate lightfastness enhancer. Also, since water soluble functional groups, such as an amino group, a hydroxy group, a carboxyl group, a sulfonic acid group, a phosphoric acid group, and the like are converted into an amide group, an ester group, a carbonyl group, a sulfonyl group, or the like, the water-fastness of a resulting print is also improved.

A lightfast colorant according to an embodiment of the present invention is a cinnamate derivative of formula (1) below:

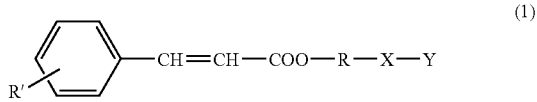
(1)

where R' is selected from the group consisting of a halogen atom, a nitro group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ oxycarbonylalkyl group, a substituted or unsubstituted $C_6$–$C_{18}$ aryl group, and a substituted or unsubstituted $C_7$–$C_{19}$ alalkylaryl group; R is selected from the group consisting of a substituted or unsubstituted $C_1$–$C_{30}$ alkylene group, a substituted or unsubstituted $C_1$–$C_{30}$ alkenylene group, a substituted or unsubstituted $C_1$–$C_{30}$ alkynylene group, a substituted or unsubstituted $C_1$–$C_{30}$ heteroalkylene group, a substituted or unsubstituted $C_6$–$C_{30}$ arylene group, a substituted or unsubstituted $C_7$–$C_{30}$ arylenealkylene group, a substituted or unsubstituted heteroarylene group, and a substituted or unsubstituted $C_4$–$C_{30}$ heteroarylenealkylene group; X is a linker selected from the group consisting of —CONH—, —NHCO—, —COO—, —OCO—, —CO—, —SO$_2$—, —SO$_3$—, —O—P(=O)(OH)—O—, and —O—P(OH)—O—; and Y is a colorant residue.

The colorant residue Y refers to a remaining moiety of the colorant, which may be either a dye or a pigment, the moiety excluding the linker X that is an amide bond, an ester bond, a carbonyl bond, a sulfonyl bond, or the like, and which links the colorant and a cinnamate derivative. The linker X is formed by a condensation reaction between a functional group in the molecular structure of the colorant (dye or pigment), such as a hydroxy group, an amino group, a sulfonic acid group, a phosphoric acid group, or the like, and a functional group of the cinnamate derivative such as a carboxyl group, a hydroxy group, or the like.

The lightfast colorant according to the present invention is derived by chemically binding a colorant having a reactive functional group as described above and a cinnamate derivative that offers light-fastness. In other words, the lightfast colorant of formula (1) according to an embodiment of the present invention may be obtained by covalently binding a colorant and a cinnamate derivative of formula (2) below through a chemical bond, such as an amide bond, an ester bond, a carbonyl bond, a sulfonyl bond, or the like:

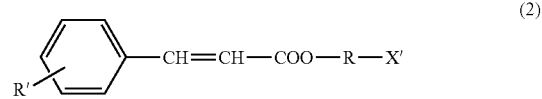
(2)

where R' and R are the same constituents referenced in formula (1) above; and X' is a reactive functional group selected from a group consisting of a carboxyl group, a hydroxy group, an amino group, a sulfonic acid group, and a phosphoric group.

As illustrated in the following reaction schemes (1) through (4), the lightfast colorant of formula (1) according to an embodiment of the present invention is derived by condensation of a carboxyl group, a hydroxy group, an amino group, a sulfonic acid group, a phosphoric acid group, or the like, which are present in the molecular structure of a source colorant and the reactive functional group X' of the cinnamate derivative of formula (2).

Reaction scheme (1)

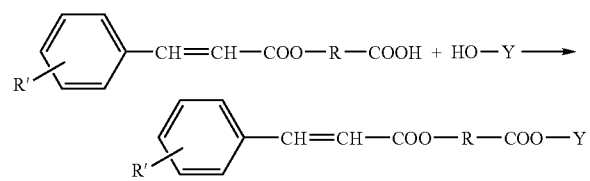

Reaction scheme (2)

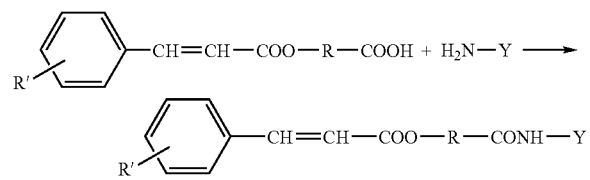

Reaction scheme (3)

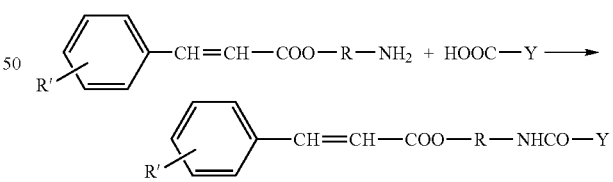

Reaction scheme (4)

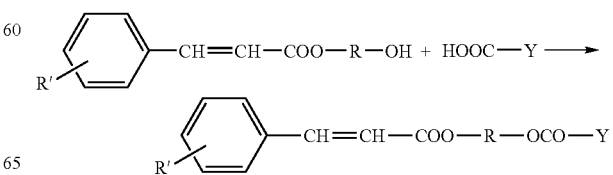

In the reaction schemes (1) through (4) above, R, R', and Y are the same constituents referenced in formula (1).

The colorant that is chemically bound with the cinnamate derivative of formula (2) is expressed as HO—Y, $H_2N$—Y, and HOOC—Y in the reaction schemes (1) through (4) and may be any dye or pigment that is commonly used in ink compositions, provided that it includes an amino group, a carboxyl group, a hydroxy group, a phosphoric acid group, a sulfonic acid group, or the like, that reacts with the reactive functional group X' of the cinnamate derivative of formula (2) in the molecular structure thereof. Specific examples of a dye include, but are not limited to, C.I. DIRECT BLACK 9, 17, 19, 22, 32, 51, 56, 91, 94, 97, 166, 168, 173 or 199; C.I Direct Blue 1, 10, 15, 22, 77, 78, 80, 200, 201, 202, 203, 207 or 211; C.I. DIRECT RED 2, 4, 9, 23, 31, 39, 63, 72, 83, 84, 89, 111, 173, 177, 184 or 240; C.I. DIRECT YELLOW 8, 9, 11, 12, 27, 28, 29, 33, 35, 39, 41, 44, 50, 53 or 58; and other direct dyes, disperse dyes, basic dyes, acid dyes, azo dyes, and the like. Specific examples of a pigment for the colorant include, but are not limited to, carbon black, graphite, vitreous carbon, activated charcoal, activated carbon, anthraquinone, phthalocyanine blue, phthalocyanine green, diazos, monoazos, pyranthrones, perylenes, quinacridones, and indigoid pigments.

As described above, R' in formulas (1) and (2) is selected from the group consisting of a halogen atom, a nitro group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ oxycarbonylalkyl group, a substituted or unsubstituted $C_6$–$C_{18}$ aryl group, and a substituted or unsubstituted $C_7$–$C_{19}$ alkylaryl group.

An alkyl group of R' has 1 to 20 carbon atoms, preferably, 1 to 10 carbon atoms. Examples of such an alkyl group include, but are not limited to, a methyl group, an ethyl group, an n-propyl group, an isopropyl group, an n-butyl group, an isobutyl group, a sec-butyl, a t-butyl group, a pentyl group, an iso-amyl group, a hexyl group, a heptyl group, an octyl group, a nonyl group, a decyl group, a dodecyl group, and the like, wherein at least one hydrogen atom in the alkyl group may be substituted with a halogen atom, a haloalkyl group, an alkoxyl group, a hydroxy group, a nitro group, a cyano group, an amino group, an aminoalkyl group, an amidino group, hydrazine, hydrazone, a carboxyl group or a salt thereof, a sulfonic acid group or a salt thereof, a phosphoric acid group or a salt thereof, or the like.

An alkoxy group of R' has 1 to 20 carbon atoms, preferably, 1 to 10 carbon atoms. Examples of such an alkoxy group include, but are not limited to, a methoxy group, an ethoxy group, an n-protoxy group, and the like, wherein at least one hydrogen atom in the alkoxy group may be substituted with a halogen atom, a haloalkyl group, an alkoxyl group, a hydroxy group, a nitro group, a cyano group, an amino group, an aminoalkyl group, an amidino group, hydrazine, hydrazone, a carboxyl group or a salt thereof, a sulfonic acid group or a salt thereof, a phosphoric acid group or a salt thereof, and the like.

An oxycarbonylalkyl group of R' has 2 to 20 carbon atoms, preferably, 2 to 10 carbon atoms. Examples of such an oxycarbonylalkyl group include, but are not limited to, an oxycarbonylmethyl group, an oxycarbonylethyl group, an oxycarbonylpropyl group, and the like.

An aryl group of R' includes at least one aromatic ring and has 6 to 18 carbon atoms, preferably, 6 to 12 carbon atoms, wherein such rings may be attached together in a pendent manner or may be fused. Examples of such an aryl group include, but are not limited to, aromatic radicals, such as phenyl, naphthyl, biphenyl, tetrahydronaphthyl, indanyl, and the like, with phenyl and naphthyl being preferred. At least one hydrogen atom in the aryl group may be substituted with a halogen atom, a haloalkyl group, an alkoxyl group, a hydroxy group, a nitro group, a cyano group, an amino group, a lower alkylamino group, an amidino group, hydrazine, hydrazone, a carboxyl group or a salt thereof, a sulfonic acid group or a salt thereof, a phosphoric acid group or a salt thereof, or the like.

An alkylaryl group of R' has 7 to 19 carbon atoms, preferably, 7–13 carbon atoms. Examples of such an alkylaryl group include, but are not limited to, a benzyl group, a phenetyl group, a trimethylphenyl group, a methylnaphthyl, an ethylnaphtyl group, and the like, wherein at least hydrogen atom in the alkylaryl group may be substituted with a halogen atom, a haloalkyl group, an alkoxyl group, a hydroxy group, a nitro group, a cyano group, an amino group, a lower alkylamino group, an amidino group, hydrazine, hydrazone, a carboxyl group or a salt thereof, a sulfonic acid group or a salt thereof, a phosphoric acid group or a salt thereof, or the like.

As described above, in formulas (1) and (2), R is selected from the group consisting of a substituted or unsubstituted $C_1$–$C_{30}$ alkylene group, a substituted or unsubstituted $C_1$–$C_{30}$ alkenylene group, a substituted or unsubstituted $C_1$–$C_{30}$ alkynylene group, a substituted or unsubstituted $C_1$–$C_{30}$ heteroalkylene group, a substituted or unsubstituted $C_6$–$C_{30}$ arylene group, a substituted or unsubstituted $C_7$–$C_{30}$ arylenealkylene group, a substituted or unsubstituted $C_3$–$C_{30}$ heteroarylene group, and a substituted or unsubstituted $C_4$–$C_{30}$ heteroarylenealkylene group. The alkylene group, the alkenylene group, the alkynylene group, the heteroalkylene group, the arylene group, the arylenealkylene group, the heteroarylene group, and the heteroarylenealkylene group are divalent radicals that may be incorporated in the middle of compounds, and which correspond to an alkyl group, an alkenyl group, an alkynyl group, a heteroalkyl group, an aryl group, an alkylaryl group, a heteroaryl group, and a heteroarylalkyl group, respectively, which are monovalent radicals positioned at an end of a compound.

The alkylene group of R may be a straight or branched radical having 1 to 30 carbon atoms, preferably, 1 to 20 carbon atoms, and more preferably, 1 to 12 carbon atoms. Specific examples of such an alkylene group include, but are not limited to, a methylene group, an ethylene group, a n-propylene group, an isopropylene group, a n-butylene group, an isobutylene group, a sec-butylene group, a t-butylene group, a n-pentylene group, a sec-pentylene group, a t-pentylene group, a hexylene group, a heptylene group, an octylene group, a nonylene group, a decylene group, a dodecylene group, and the like. At least one hydrogen atom in the alkylene group may be substituted with a halogen atom, a haloalkyl group, an alkoxyl group, a hydroxy group, a nitro group, a cyano group, an amino group, an aminoalkyl group, an amidino group, hydrazine, hydrazone, a carboxyl group or a salt thereof, a sulfonic acid group or a salt thereof, a phosphoric acid group or a salt thereof, or the like.

The $C_1$–$C_{30}$ alkenylene group or alkynylene group of R correspond to the $C_1$–$C_{30}$ alkylene groups, the only difference being that the $C_1$–$C_{30}$ alkenylene group or alkynylene group of R has at least one carbon-carbon double bond or carbon-carbon triple bond, respectively. At least one hydrogen atom in the alkenylene or alkynylene group may be substituted with a halogen atom, a haloalkyl group, an alkoxyl group, a hydroxy group, a nitro group, a cyano group, an amino group, an aminoalkyl group, an amidino group, hydrazine, hydrazone, a carboxyl group or a salt thereof, a sulfonic acid group or a salt thereof, a phosphoric acid group or a salt thereof, or the like.

The heteroalkylene group of R refers to a $C_1$–$C_{30}$ alkylene group that includes one, two, or three hetero atoms selected from the group consisting of N, O, P, and S. Specific examples of such a heteroalkylene group include an oxymethylene group, an oxyethylene group, an oxypropoxy group, a mercaptomethylene group, a mercaptoethylene group, a mercaptopropoxy group, and the like. At least one hydrogen atom in the heteroalkylene group may be substituted with a halogen atom, a haloalkyl group, an alkoxyl group, a hydroxy group, a nitro group, a cyano group, an amino group, an aminoalkyl group, an amidino group, hydrazine, hydrazone, a carboxyl group or a salt thereof, a sulfonic acid group or a salt thereof, a phosphoric acid group or a salt thereof, or the like.

The arylene group of R may have 6 to 30 carbon atoms, preferably, 6 to 18 carbon atoms, more preferably, 6 to 12 carbon atoms, and have at least one aromatic ring wherein such rings may be attached together in a pendant manner or may be fused. Specific examples of such an arylene group include, but are not limited to, aromatic groups, such as a phenylene group, a naphthylene group, a biphenylene group, a tetrahydronaphthylene group, an indanylene group, and the like, with the phenylene group, biphenylene group, and nathphylene group being preferred. At least one hydrogen atom in the arylene group may be substituted with a halogen atom, a haloalkyl group, an alkoxyl group, a hydroxy group, a nitro group, a cyano group, an amino group, a lower alkylamino group, an amidino group, hydrazine, hydrazone, a carboxyl group or a salt thereof, a sulfonic acid group or a salt thereof, a phosphoric acid group or a salt thereof, or the like.

The arylenealkylene group of R may have 7 to 30 carbon atoms, preferably, 7 to 13 carbon atoms. Specific examples of such an arylenealkylene group include, but are not limited to, a phenylene methylene group, a phenylene ethylene group, a naphthylene methylene group, a naphthylene ethylene group, a biphenylene methylene group, a biphenylene ethylene group, a phenylene n-propylene group, a phenylene iso-propylene group, and the like. At least one hydrogen atom in the arylenealkylene group may be substituted with a halogen atom, a haloalkyl group, an alkoxyl group, a hydroxy group, a nitro group, a cyano group, an amino group, a lower alkylamino group, an amidino group, hydrazine, hydrazone, a carboxyl group or a salt thereof, a sulfonic acid group or a salt thereof, a phosphoric acid group or a salt thereof, or the like.

The heteroarylene group of R refers to a $C_3$~$C_{30}$ divalent aromatic, carbocyclic system containing one, two, or three hetero atoms as an aromatic ring backbone atom selected from the group consisting of N, O, P, and S. The heteroarylene group includes a divalent arylene group that has a hetero atom oxidized or formed into a quaternary compound, for example, an N-oxide or a quaternary salt. Preferably, the heteroarylene group may have 3 to 15 carbon atoms. Specific examples of such a heteroarylene group include, but are not limited to, thienylene, benzothienylene, pyridylene, pyrazinylene, pyrimidinylene, pyridazinylene, quinolinylene, quinoxalinylene, imidazolylene, furanylene, benzofuranylene, thiazolylene, isoxazolylene, benzisoxazolylene, benzimidazolylene, triazolylene, pyrazolylene, pyrrolylene, indolylene, 2-pyridonylene, 4-pyridonylene, N-alkyl-2-pyrinonylene, pyrazinonylene, pyridazinonylene, pyrimidinonylene, oxazolonylene, an N-oxide of the foregoing groups, such as pyridylene N-oxide and quinolinylene N-oxide, and a quaternary salt of the foregoing groups. At least one hydrogen atom in the heteroarylene group may be substituted with a halogen atom, a haloalkyl group, an alkoxyl group, a hydroxy group, a nitro group, a cyano group, an amino group, a lower alkylamino group, an amidino group, hydrazine, hydrazone, a carboxyl group or a salt thereof, a sulfonic acid group or a salt thereof, a phosphoric acid group or a salt thereof, or the like.

The heteroarylenealkylene group of R refers to a heteroarylene group that has alkylene groups substituted for some hydrogen atoms. The heteroarylenealkylene group may have 4 to 30 carbon atoms, preferably, 4 to 16 carbon atoms. Specific examples of such a heteroarylenealkylene group include, but are not limited to, thienylene methylene, thienylene ethylene, benzothienylene methylene, benzothienylene ethylene, pyridylene methylene, pyridylene ethylene, pyrazinylene methylene, pyrazinylene ethylene, pyrimidinylene methylene, pyrimidinylene ethylene, pyridazinylene methylene, pyridazinylene ethylene, quinolinylene methylene, quinolinylene ethylene, quinoxalinylene methylene, quinoxalinylene ethylene, imidazolylene methylene, imidazolylene ethylene, furanylene methylene, furanylene ethylene, and the like. At least one hydrogen atom in the heteroarylenealkylene group may be substituted with a halogen atom, a haloalkyl group, an alkoxyl group, a hydroxy group, a nitro group, a cyano group, an amino group, a lower alkylamino group, an amidino group, hydrazine, hydrazone, a carboxyl group or a salt thereof, a sulfonic acid group or a salt thereof, a phosphoric acid group or a salt thereof, or the like.

Specific examples of the lightfast colorant of formula (1) above according to embodiments of the present invention include lightfast colorants having formulas (3) through (8) below.

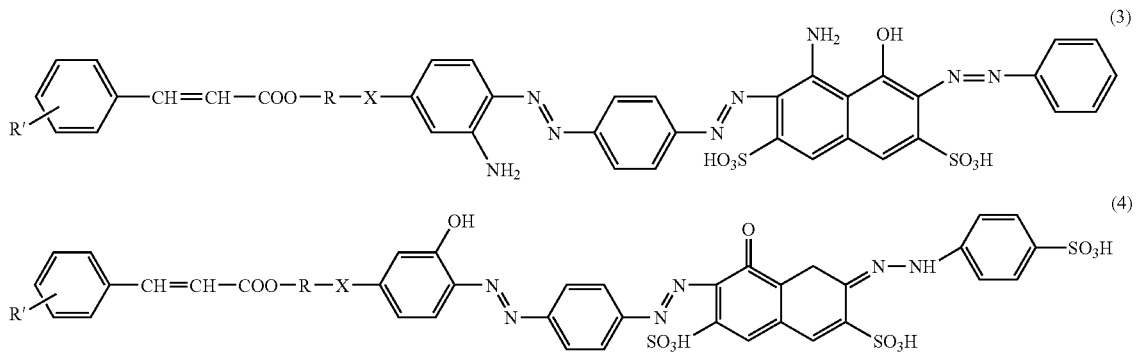

-continued

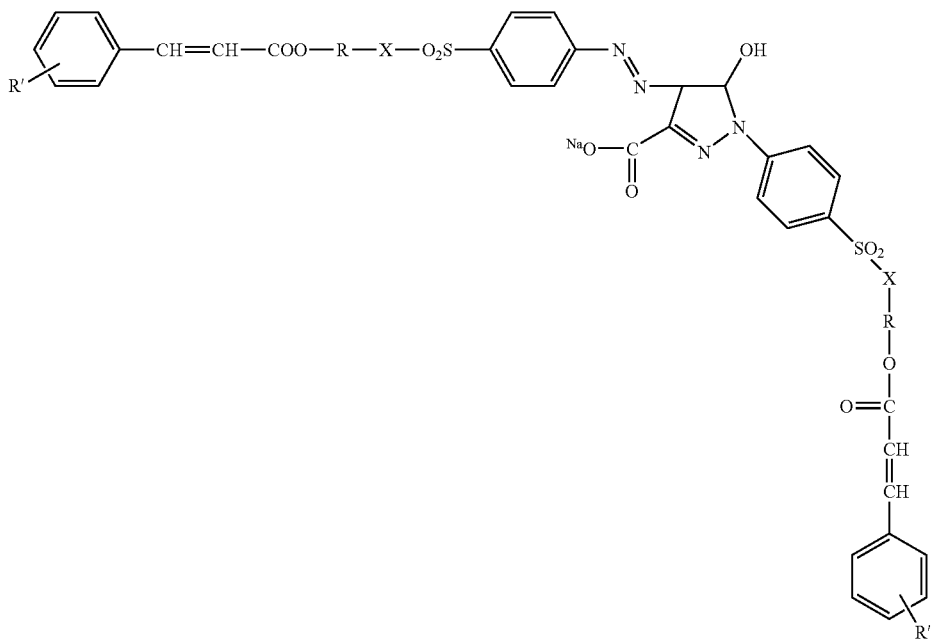

(5)

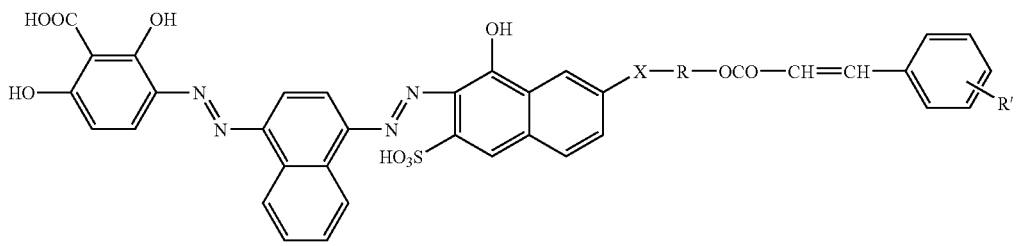

(6)

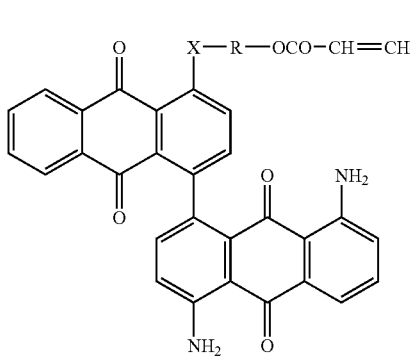

(7)

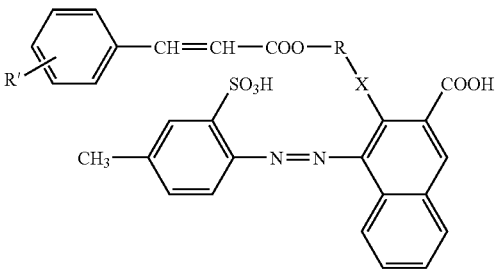

(8)

In formulas (3) through (8) above, R', R, and X are the same constituents referenced in formula (1).

Hereinafter, a lightfast ink composition according to an embodiments of the present invention that includes the above cinnamate derivative of formula (1) will now be described in detail.

An ink composition according to an embodiment of the present invention exclusively includes the above lightfast colorant of formula (1) as a colorant. In particular, an ink composition according to an embodiment of the present invention includes at least one lightfast colorant selected from the group consisting of the above-described lightfast colorants and an aqueous medium. In this embodiment, the amount of the colorant may be in the range of 0.1–20 parts by weight, preferably, 1–10 parts by weight, with respect to 100 parts by weight of the ink composition.

An ink composition according to another embodiment of the present invention includes both a conventional colorant and the lightfast colorant of formula (1). In particular, an ink composition may include a conventional colorant, at least one of the above-described lightfast colorants according to an embodiment of the present invention, and an aqueous medium. In this embodiment, the amount of the conventional colorant may be in the range of 1–15 parts by weight and the amount of the lightfast colorant of formula (1) may be in the range of 1–15 parts by weight with respect to 100 parts by weight of the ink composition. Preferably, the total amount of the general colorant and the lightfast colorant of formula (1) may be in the range of 2–20 parts by weight, more preferably, 2–10 parts by weight, with respect to 100 parts by weight of the ink composition.

In the above ink compositions, the conventional colorant and the lightfast colorant according to embodiments of the present invention are dissolved or dispersed in the aqueous medium.

The aqueous medium may be water alone or a mixture of 5–50% by weight of an organic solvent and 50–95% by weight of water.

The amounts of water and the organic solvent in the aqueous medium may be varied depending on various factors, for example, desired characteristics, such as viscosity, surface tension, drying speed, and the like, of the ink composition. Desirable characteristics of ink compositions vary depending on the printing methods of printers and the types of printing media.

Examples of a suitable organic solvent include, but are not limited to, alcohols, such as methyl alcohol, ethyl alcohol, n-propyl alcohol, isopropyl alcohol, n-butyl alcohol, sec-butyl alcohol, t-butyl alcohol, isobutyl alcohol, and the like; ketones, such as acetone, methylethyl ketone, diacetone alcohol, and the like; esters, such as methyl acetate, ethyl acetate, ethyl lactate, and the like; polyhydric alcohols, such as ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate, trimethylolpropane ethoxylate, and the like; ethers, such as ethylene glycol monomethyl ether, ethylene glycol monoethyl ether, diethylene glycol methyl ether, diethylene glycol ethyl ether, triethylene glycol monomethyl ether, triethylene glycol monoethyl ether, and the like; nitrogen-containing compounds, such as 2-pyrrolidone, N-methyl-2-pyrrolidone, and the like; and sulfur-containing compounds, such as dimethyl sulfoxide, tetramethylene sulfone, and thioglycol.

Each of the above ink compositions according to embodiments of the present invention may further include at least one additive selected from the group consisting of a dispersant, a viscosity adjuster, a surfactant, a storage stabilizer, and a wetting agent.

When a pigment or a water-insoluble dye is used as the colorant, at least one dispersant may be added to the ink composition to improve the dispersion stability of the colorant. Any dispersants, including simpler structure, lower molecular weight dispersants, and larger molecular weight dispersants, such as block copolymers which do not impair physical properties such as stability, and functionality of the ink composition, may be used without limitation.

Specific examples of lower molecular weight, simpler structure dispersants include, but are not limited to, polyvinyl alcohol (PVA), cellulosics, ethylene oxide modified phenols, an ethylene oxide/propylene oxide polymer, a sodium polyacrylate solution (TEGO, DISPERSE 715W), a modified polyacryl resin solution (TEGO, DISPERSE 735W), a solution of alkylol ammonium salt of a low molecular weight carboxylic polymer (BYK-CHEMIE, DISPERBYK), a solution of alkylol ammonium salt of a multifunctional polymer (BYK-CHEMIE, DISPERBYK-181), and a mixture of the foregoing dispersants.

Specific examples of the complex, larger molecular weight dispersants include, but are not limited to, siloxanes, such as a polyester siloxane copolymer (TEGO, WET KL 245/WET 260), and hydrophilic polymers having the structure of AB or BAB type wherein A is a hydrophobic homopolymer or copolymer of unsubstituted or substituted $C_1$–$C_{30}$ acrylic monomers and B is a hydrophilic polymer or copolymer of unsubstituted or substituted $C_1$–$C_{30}$ acrylic monomers. More specific examples of the complex, larger molecular weight dispersants include, but are not limited to, an acrylic acid/acrylate copolymer, a methacrylic acid/methacrylate copolymer, an acrylic acid/polydialkylsiloxane/acrylate block copolymer, and a mixture of the foregoing polymers.

In each of the above ink compositions according to embodiments of the present invention, the amount of the dispersant may be in the range of 1–20 parts by weight with respect to 100 parts by weight of the ink composition.

The viscosity adjuster of each of the ink compositions is used to adjust the viscosity of the ink composition for smoother jetting. Specific examples of such a viscosity adjuster include, but are not limited to, casein, carboxymethylcellulose, and the like. The amount of the viscosity adjuster may be in the range of 0.1–5 parts by weight with respect to 100 parts by weight of the ink composition.

In each of the above ink compositions according to embodiments of the present invention, the amount of the surfactant may be in the range of 0.1–5 parts by weight with respect to 100 parts by weight of the ink composition. The surfactant of each of the ink compositions affects surface tension of the composition such that the ink composition is more stably jetted through a nozzle. An anionic surfactant or a nonionic surfactant may be used.

Examples of an anionic surfactant that may be used in the present invention include, but are not limited to, a salt of alkylcarboxylic acid having 2 to 1,000 carbon atoms, preferably, 10 to 200 carbon atoms, a salt of sulfonic acid having 2 to 1,000 carbon atoms, preferably, 10 to 200 carbon atoms, a salt of alkyl sulfonic acid ester having 2 to 1,000 carbon atoms, preferably, 10 to 200 carbon atoms, a salt of alkylsulfonic acid having 2 to 1,000 carbon atoms, preferably, 10 to 200 carbon atoms, a salt of alkylaryl sulfonic acid having 7 to 1,000 carbon atoms, preferably, 10 to 200 carbon atoms, and a mixture of the foregoing salts.

Examples of a nonionic surfactant that may be used in the present invention include, but are not limited to, a polyoxyethylene alkyl ether having a $C_1$–$C_{1000}$, preferably, $C_{10}$–$C_{200}$, alkyl group, polyoxyethylene alkyl phenyl ether having a $C_1$–$C_{1000}$, preferably, $C_{10}$–$C_{200}$, alkyl group, polyoxyethylene secondary alkyl ether, a polyoxyethylene-oxypropylene block copolymer, a polyglycerin fatty acid ester, sorbitan fatty acid ester, and a mixture of the foregoing materials.

In each of the above ink compositions according to embodiments of the present invention, the amount of the surfactant may be in the range of 0.1–5 parts by weight with respect to 100 parts by weight of the ink composition.

The wetting agent of each of the ink compositions prevents nozzles from clogging. A polyhydric alcohol may be used as the wetting agent. Specific examples of the wetting agent that may be used in the present invention include, but are not limited to, glycerin, ethylene glycol, diethylene glycol, triethylene glycol, propylene glycol, dipropylene glycol, hexylene glycol, 1,3-butane diol, 1,4-butane diol, 1.5-pentane diol, 2-butene-1,4-diol, 2-methyl-2-pentanediol and a mixture of the foregoing alcohols. In each of the above ink compositions according to embodiments of the present invention, the amount of the wetting agent may be in the range of 10–30 parts by weight with respect to 100 parts by weight of the ink composition.

In each of the above ink compositions according to embodiments of the present invention, the total amount of at least one additive selected from the group consisting of a dispersant, a viscosity adjuster, a surfactant, a storage stabilizer, and a wetting agent may be in the range of 0.5–40 parts by weight with respect to 100 parts by weight of the ink composition.

A method of preparing the above ink compositions, according to an embodiment of the present invention, will now be described.

The lightfast colorant and/or a conventional colorant and other additives, for example, a dispersant, a viscosity adjuster, a surfactant, and the like, are mixed together in an aqueous medium and thoroughly stirred to obtain a homogeneous composition. This composition is passed through a filter having an average pore size of 0.45–0.8 μm to obtain an ink composition according to an embodiment of the present invention.

The sulfonic acid group of the lightfast colorant of formula (1) according to an embodiment of the present invention may include a metallic sulfonate group, such as a sodium sulfonate group.

The present invention will be described in greater detail with reference to the following examples. The following examples are for illustrative purposes and are not intended to limit the scope of the invention.

EXAMPLE 1

4-carboxyphenyl-4'-methoxycinnamate was synthesized according to reaction scheme (5) below.

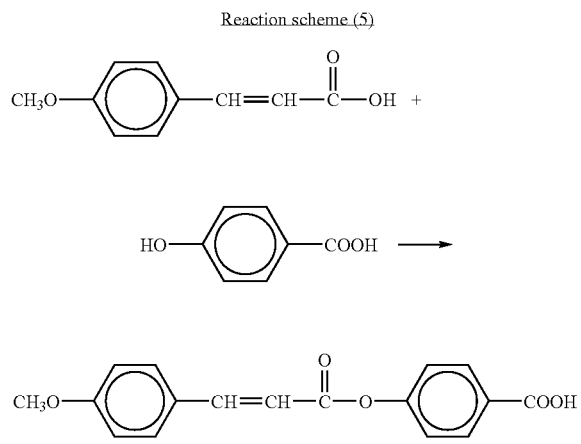

Reaction scheme (5)

A 250-mL round-bottomed flask equipped with a reflux condenser was charged with 150 mL of dimethylsulfoxide (DMSO) and 9 g of 4-methoxycinnamic acid. 6 g of thionyl chloride was added into the flask in a nitrogen atmosphere and stirred. 7 g of 4-hydroxybenzoic acid was slowly added into the mixture, heated slowly to about 60° C. while stirring it, and reacted for 5 hours. The reaction mixture was cooled to room temperature, and the reaction product was poured into excess distilled water to precipitate it. The resulting precipitates were filtered, washed several times with distilled water, and recrystallized using a solvent mixture of chloroform and ethanol to provide 12.5 g of 4-carboxyphenyl-4'-methoxycinnamate.

EXAMPLE 2

5-carboxypentyl-4'-methoxycinnamate was synthesized according to reaction scheme (6) below.

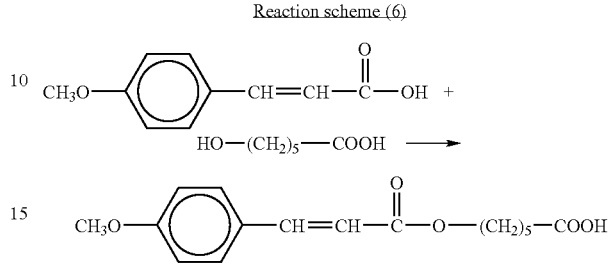

Reaction scheme (6)

A 250-mL round-bottomed flask equipped with a reflux condenser was charged with 150 mL of DMSO and 9 g of 4-methoxycinnamic acid. 6 g of thionyl chloride was added into the flask in a nitrogen atmosphere and stirred. 6.5 g of 6-hydroxycaproic acid was slowly added into the mixture, heated slowly to about 60° C. while stirring it, and reacted for 5 hours. The reaction mixture was cooled to room temperature, and the reaction product was poured into excess distilled water to precipitate it. The resulting precipitates were filtered, washed several times with distilled water, and recrystallized using a solvent mixture of chloroform and ethanol to provide 11.3 g of 5-carboxypentyl-4'-methoxycinnamate.

EXAMPLE 3

2-carboxy-1-methylethyl-4'-methoxycinnamate was synthesized according to reaction scheme (7) below.

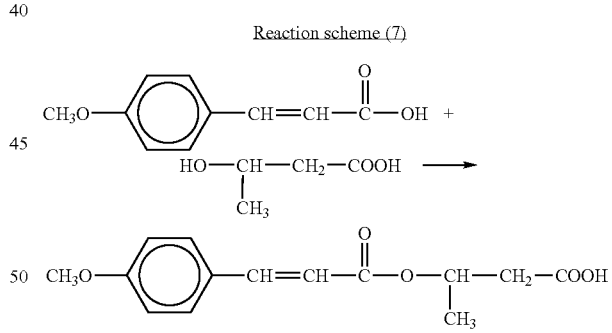

Reaction scheme (7)

A 250-mL round-bottomed flask equipped with a reflux condenser was charged with 150 mL of DMSO and 9 g of 4-methoxycinnamic acid. 6 g of thionyl chloride was added into the flask in a nitrogen atmosphere and stirred. 5 g of 3-hydroxybutyric acid was slowly added into the mixture, heated slowly to about 60° C. while stirring it, and reacted for 5 hours. The reaction mixture was cooled to room temperature, and the reaction product was poured into excess distilled water to precipitate it. The resulting precipitates were filtered, washed several times with distilled water, and recrystallized using a solvent mixture of chloroform and ethanol to provide 8.5 g of 2-carboxy-1-methylethyl-4'-methoxycinnamate.

EXAMPLE 4

11-carboxyundecyl-4'-methoxycinnamate was synthesized according to reaction scheme (8) below.

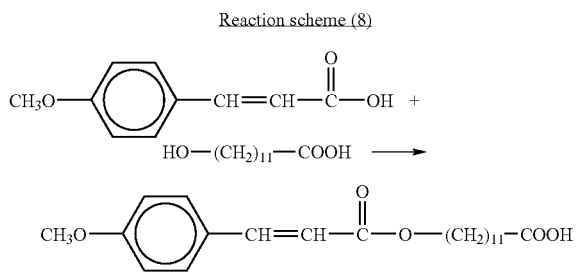

Reaction scheme (8)

A 250-mL round-bottomed flask equipped with a reflux condenser was charged with 150 mL of DMSO and 9 g of 4-methoxycinnamic acid. 6 g of thionyl chloride was added into the flask in a nitrogen atmosphere and stirred. 5 g of 12-hydroxydodecanoic acid was slowly added into the mixture, heated slowly to about 60° C. while stirring it, and reacted for 5 hours. The reaction mixture was cooled to room temperature, and the reaction product was poured into excess distilled water to precipitate it. The resulting precipitates were filtered, washed several times with distilled water, and recrystallized using a solvent mixture of chloroform and ethanol to provide 14.7 g of 11-carboxyundecyl-4'-methoxycinnamate.

EXAMPLE 5

A lightfast colorant of formula (9) below was synthesized by reacting the cinnamate derivative obtained in Example 1 and direct dye C.I. DIRECT BLACK 168.

15 g of the cinnamate derivative synthesized in Example 1 and 33.2 g of C.I. DIRECT BLACK 168 were dissolved in 150 mL of ethyl acetate solvent in a 250-mL round-bottomed flask equipped with a reflux condenser. 30 mL of conc. sulfuric acid was slowly added together with one or two boiling chips into the solution and refluxed for 12 hours or longer. The reaction solution was washed with distilled water and the organic phase was collected. This organic phase was concentrated and recrystallized to provide 33.5 g of the lightfast colorant of formula (9).

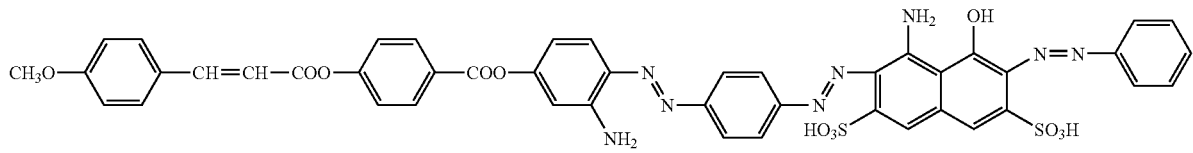

(9)

EXAMPLE 6

A lightfast colorant of formula (10) below was synthesized by reacting the cinnamate derivative obtained in Example 2 and acidic dye C.I. ACID BLACK 191.

14.6 g of the cinnamate derivative synthesized in Example 2 was dissolved in 150 mL of DMSO in a 500-mL round-bottomed flask equipped with a reflux condenser. 6 g of $SOCl_2$ was added to the mixture and reacted at room temperature for 1 hour or longer. A solution of 38.6 g of C.I. ACID BLACK 191 in 200 mL of DMSO was added into the flask together with one or two boiling chips and reacted at 80° C. for 8 hours or longer. The reaction product was cooled to room temperature, and an excess amount of methanol was added to precipitate a desired crystalline compound. The crystalline precipitates were filtered by suction and washed. To remove unreacted products, the crystalline compound was dissolved in DMSO and precipitated with methanol. The resulting crystalline precipitates were filtered by suction, washed, and dried in an oven to provide 32.5 g of the lightfast colorant of formula (10).

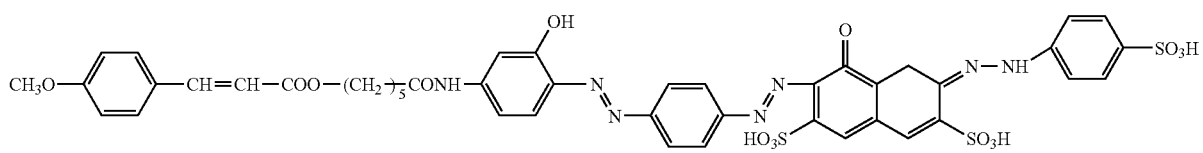

(10)

EXAMPLE 7

A lightfast colorant of formula (11) below was synthesized by reacting the cinnamate derivative obtained in Example 3 and acidic dye C.I. ACID YELLOW 23.

26.5 g of the cinnamate derivative synthesized in Example 3 was dissolved in 200 mL of DMSO in a 500-mL round-bottomed flask equipped with a reflux condenser. 12.5 g of $SOCl_2$ was added to the mixture and reacted at room temperature for 1 hour or longer. A solution of 24.5 g of C.I. ACID YELLOW 23 in 200 mL of DMSO was added into the flask together with one or two boiling chips and reacted at about 80° C. for 8 hours or longer. The reaction product was cooled to room temperature, and excess methanol was added to precipitate a desired crystalline compound. The crystalline precipitates were filtered by suction and washed. To remove unreacted products, the crystalline compound was dissolved in DMSO and precipitated with methanol. The resulting crystalline precipitates were filtered by suction, washed, and dried in an oven to provide 27.5 g of the lightfast colorant of formula (11).

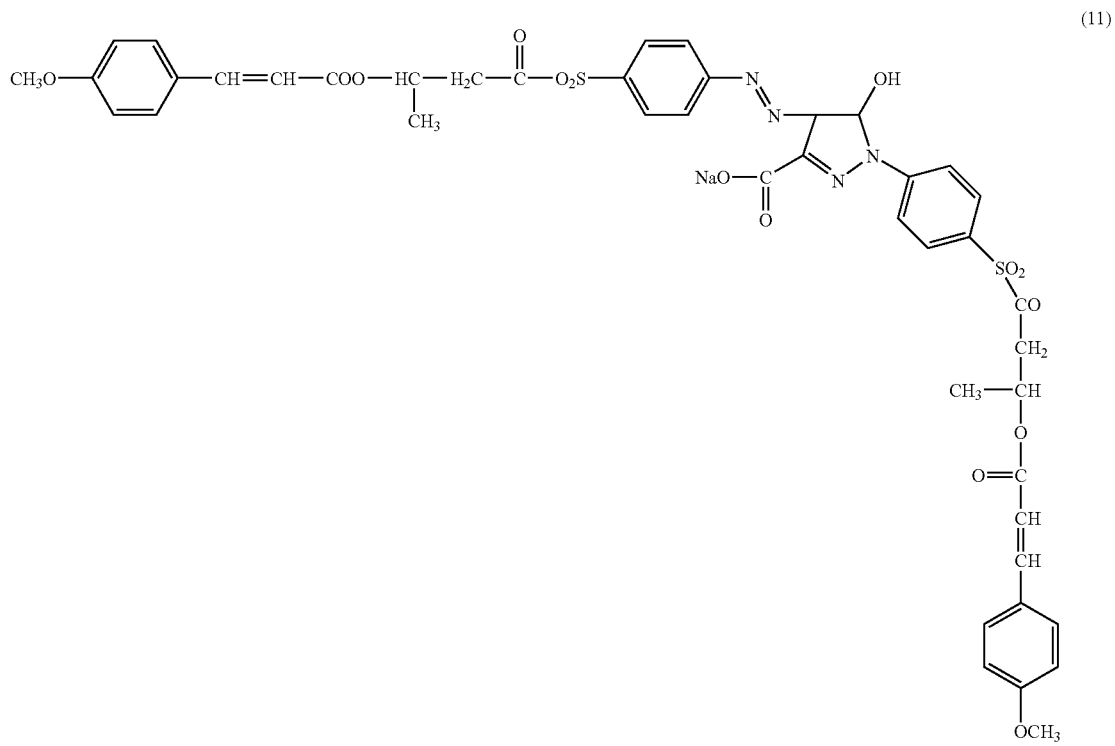

(11)

EXAMPLE 8

A lightfast colorant of formula (12) below was synthesized by reacting the cinnamate derivative obtained in Example 4 and direct dye C.I. DIRECT BLACK 51.

18.8 g of the cinnamate derivative synthesized in Example 4 was dissolved in 150 mL of DMSO in a 500-mL round-bottomed flask equipped with a reflux condenser. 6 g of $SOCl_2$ was added to the mixture and reacted at room temperature for 1 hour or longer. A solution of 28.7 g of C.I. DIRECT BLACK 51 in 200 mL of DMSO was added into the flask together with one or two boiling chips and reacted at about 80° C. for 8 hours or longer. The reaction product was cooled to room temperature, and excess methanol was added to precipitate a desired crystalline compound. The crystalline precipitates were filtered by suction and washed. To remove unreacted products, the crystalline compound was dissolved in DMSO and precipitated with methanol. The resulting crystalline precipitates were filtered by suction, washed, and dried in an oven to provide 28.5 g of the lightfast colorant of formula (12).

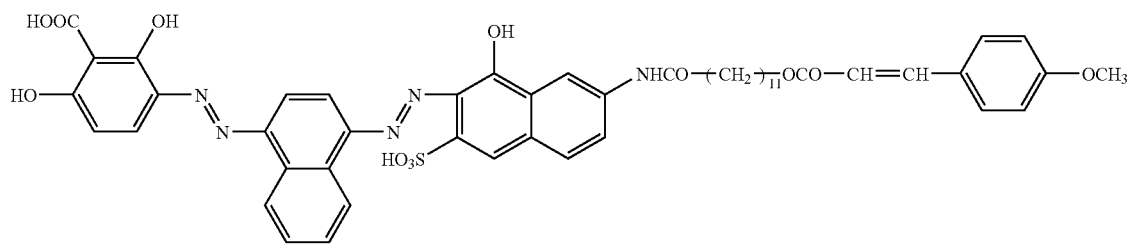

(12)

EXAMPLE 9

A lightfast colorant of formula (13) below was synthesized by reacting the cinnamate derivative obtained in Example 1 and C.I. PIGMENT RED 177.

15 g of the cinnamate derivative synthesized in Example 1 was dissolved in 150 mL of DMSO in a 500-mL round-bottomed flask equipped with a reflux condenser. 6 g of $SOCl_2$ was added to the mixture and reacted at room temperature for 1 hour or longer. A solution of 17.5 g of C.I. PIGMENT RED 177 in 200 mL of DMSO was added into the flask together with one or two boiling chips and reacted at about 80° C. for 8 hours or longer. The reaction product was cooled to room temperature, and excess methanol was added to precipitate a desired crystalline compound. The crystalline precipitates were filtered by suction and washed. To remove unreacted products, the crystalline compound was dissolved in DMSO and precipitated with methanol. The resulting crystalline precipitates were filtered by suction, washed, and dried in an oven to provide 23.5 g of the lightfast colorant of formula (13).

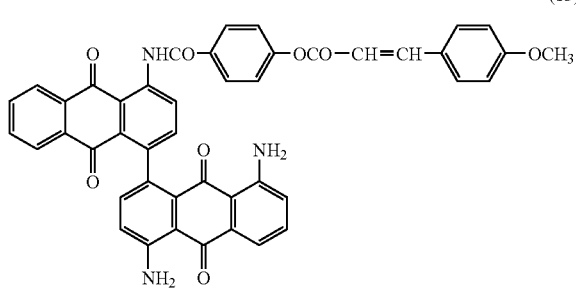

(13)

EXAMPLE 10

A lightfast colorant of formula (14) below was synthesized by reacting the cinnamate derivative obtained in Example 1 and C.I. PIGMENT RED 57.

15 g of the cinnamate derivative synthesized in Example 1 was dissolved in 150 mL of DMSO in a 500-mL round-bottomed flask equipped with a reflux condenser. 6 g of $SOCl_2$ was added to the mixture and reacted at room temperature for 1 hour or longer. A solution of 20.4 g of C.I. PIGMENT RED 57 in 200 mL of DMSO was added into the flask together with one or two boiling chips and reacted at about 80° C. for 8 hours or longer. The reaction product was cooled to room temperature, and excess methanol was added to precipitate a desired crystalline compound. The crystalline precipitates were filtered by suction and washed. To remove unreacted products, the crystalline compound was dissolved in DMSO and precipitated with methanol. The resulting crystalline precipitates were filtered by suction, washed, and dried in an oven to provide 24.5 g of the lightfast colorant of formula (14).

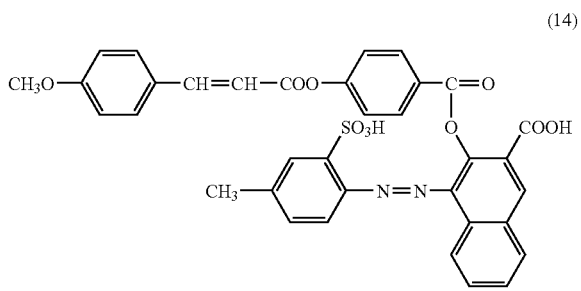

(14)

EXAMPLE 11

Ink Composition

| COMPONENT | CONTENT |
| --- | --- |
| Colorant (C.I. DIRECT BLACK 168) | 3 g |
| Lightfast Colorant of Example 5 | 1 g |
| Water | 77 g |
| Isopropyl alcohol | 3 g |
| Ethylene glycol | 10 g |
| Glycerin | 6 g |

The above-listed components were mixed together and stirred for about 30 minutes or longer to obtain a homogeneous composition. This composition was passed through a 0.45-μm filter to provide a desired lightfast ink composition according to the an embodiment of the present invention.

EXAMPLE 12

A lightfast ink composition according to an embodiment of the present invention was prepared in the same manner as in Example 11, except that dye C.I. ACID BLACK 191 and the lightfast colorant synthesized in Example 6 were used instead of C.I. DIRECT BLACK 168 and the lightfast colorant synthesized in Example 5, respectively.

EXAMPLE 13

A lightfast ink composition according to an embodiment of the present invention was prepared in the same manner as in Example 11, except that dye C.I. ACID YELLOW 23 and the lightfast colorant synthesized in Example 7 were used instead of C.I. DIRECT BLACK 168 and the lightfast colorant synthesized in Example 5, respectively.

EXAMPLE 14

A lightfast ink composition according to an embodiment of the present invention was prepared in the same manner as in Example 11, except that dye C.I. DIRECT BLACK 51 and the lightfast colorant synthesized in Example 8 were used instead of C.I. DIRECT BLACK 168 and the lightfast colorant synthesized in Example 5, respectively.

EXAMPLE 15

A lightfast ink composition according to an embodiment of the present invention was prepared in the same manner as in Example 11, except that C.I. PIGMENT RED 177 and the lightfast colorant synthesized in Example 9 were used instead of C.I. DIRECT BLACK 168 and the lightfast colorant synthesized in Example 5, respectively. 5.0 g of TEGO DISPERS 750 W (available from TEGO CHEMIE SERVICE GmbH) acting as a dispersant was further added, and the amount of water was reduced to 72 g. A 0.8-μm filter was used.

EXAMPLE 16

A lightfast ink composition according to an embodiment of the present invention was prepared in the same manner as in Example 11, except that C.I. PIGMENT RED 57 and the lightfast colorant synthesized in Example 10 were used instead of C.I. DIRECT BLACK 168 and the lightfast colorant synthesized in Example 5, respectively.

EXAMPLE 17

A lightfast ink composition according to an embodiment of the present invention was prepared in the same manner as in Example 11, except that only 4 g of the lightfast colorant synthesized in Example 5 was used, without using dye C.I. DIRECT BLACK 168.

COMPARATIVE EXAMPLE 1

An ink composition was prepared in the same manner as in Example 11, except that only 4 g of dye C.I. DIRECT BLACK 168 was used as the colorant.

COMPARATIVE EXAMPLE 2

An ink composition was prepared in the same manner as in Example 12, except that only 4 g of dye C.I. ACID BLACK 191 was used as the colorant.

COMPARATIVE EXAMPLE 3

An ink composition was prepared in the same manner as in Example 13, except that only 4 g of dye C.I. ACID YELLOW 23 was used as the colorant.

COMPARATIVE EXAMPLE 4

An ink composition was prepared in the same manner as in Example 14, except that only 4 g of dye C.I. DIRECT BLACK 51 was used as the colorant.

COMPARATIVE EXAMPLE 5

An ink composition was prepared in the same manner as in Example 15, except that only 4 g of C.I. PIGMENT RED 177 was used as the colorant.

COMPARATIVE EXAMPLE 6

An ink composition was prepared in the same manner as in Example 16, except that only 4 g of C.I. PIGMENT RED 57 was used as the colorant.

COMPARATIVE EXAMPLE 7

An ink composition was prepared in the same manner as in Comparative Example 1, except that 0.2 g of octyl-methoxycinnamate was further added as a lightfastness enhancer.

COMPARATIVE EXAMPLE 8

An ink composition was prepared in the same manner as in Comparative Example 2, except that 0.2 g of octyl-methoxycinnamate was further added as a lightfastness enhancer.

COMPARATIVE EXAMPLE 9

An ink composition was prepared in the same manner as in Comparative Example 3, except that 0.2 g of octyl-methoxycinnamate was further added as a lightfastness enhancer.

COMPARATIVE EXAMPLE 10

An ink composition was prepared in the same manner as in Comparative Example 4, except that 0.2 g of octyl-methoxycinnamate was further added as a lightfastness enhancer.

The lightfastness and anti-clogging property of each of the ink compositions prepared in the examples and the comparative examples were evaluated as follows.

Storage Stability (Anti-clogging Property) Test 100 mL of samples of the ink compositions prepared in Examples 11 through 17 and Comparative Examples 1 through 10 were portioned into respective heat-resistant glass bottles. The glass bottles were sealed and stored in a 60° C. water bath for 2 months. It was observed whether precipitates appeared in the bottles. The results are shown in Table 1. In Table 1, 0 indicates that no precipitate appears, and X indicates that precipitates appear.

TABLE 1

| No. | Example | | | | | | | Comparative Example | | | | | | | | | |
|---|---|---|---|---|---|---|---|---|---|---|---|---|---|---|---|---|---|
| | 11 | 12 | 13 | 14 | 15 | 16 | 17 | 1 | 2 | 3 | 4 | 5 | 6 | 7 | 8 | 9 | 10 |
| Result | 0 | 0 | 0 | 0 | 0 | 0 | 0 | 0 | 0 | 0 | 0 | 0 | 0 | X | X | X | X |

As shown in Table 1, for the ink compositions prepared in Examples 11 through 14, which contain the lightfast colorants according to embodiments of the present invention, no precipitate appears, indicating that the ink compositions according to embodiments of the present invention have better storage stability than the ink compositions of Comparative Examples 7 through 10 containing the conventional colorant and the lightfastness enhancer which show precipitation.

Lightfastness Test

2×2 cm solid patterns were printed using the ink compositions of Examples 11 through 17 and Comparative Examples 1 through 10, and an ink jet printer (MJC 1130i, available from SAMSUNG ELECTRONICS CO.). The printed results were exposed to light for 100 hours in a Q-SUN XENON TEST CHAMBER. Optical density (OD) was measured before and after the light exposure, and A values (lightfastness values) were calculated using the following equation. Lightfastness was evaluated as good (G) for $A \geq 90$, moderate (M) for $75 \leq A < 90$, and poor (×) for $A < 75$. The results are shown in Table 2.

$A = \times 100(\%)$

TABLE 2

| No. | Example | | | | | | | Comparative Example | | | | | | | | | |
|---|---|---|---|---|---|---|---|---|---|---|---|---|---|---|---|---|---|
| | 11 | 12 | 13 | 14 | 15 | 16 | 17 | 1 | 2 | 3 | 4 | 5 | 6 | 7 | 8 | 9 | 10 |
| Result | G | G | G | G | G | G | G | X | X | X | X | M | M | G | G | G | G |

As shown in Table 2, the ink compositions prepared in Examples 11 through 17, which contain the lightfast colorants according to embodiments of the present invention, have improved lightfastness by showing A values of 90% or more. However, the ink compositions prepared in Comparative Examples 1 through 6, which contain the conventional colorants, have lightfastness values of less then 90%. Evidently, the ink compositions according to embodiments of the present invention have improved lightfastness compared to the conventional ink compositions.

As described above, the lightfast colorants according to embodiments of the present invention that are derived by covalently binding a lightfast cinnamate derivative to a conventional colorant have better lightfastness and improve the storage stability as well as the lightfastness of an ink composition when added to the ink composition.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lightfast colorant that is a cinnamate derivative of formula (1) below:

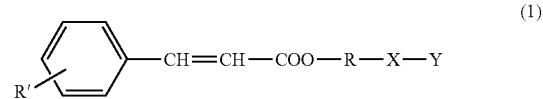

where R' is selected from the group consisting of a halogen atom, a nitro group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ oxycarbonylalkyl group, a substituted or unsubstituted $C_6$–$C_{18}$ aryl group, and a substituted or unsubstituted $C_7$–$C_{19}$ alkylaryl group; R is selected from the group consisting of a substituted or unsubstituted $C_1$–$C_{30}$ alkylene group, a substituted or unsubstituted $C_1$–$C_{30}$ alkenylene group, a substituted or unsubstituted $C_1$–$C_{30}$ alkynylene group, a substituted or unsubstituted $C_1$–$C_{30}$ heteroalkylene group, a substituted or unsubstituted $C_6$–$C_{30}$ arylene group, a substituted or unsubstituted $C_7$–$C_{30}$ arylenealkylene group, a substituted or unsubstituted heteroarylene group, and a substituted or unsubstituted $C_4$–$C_{30}$ heteroarylenealkylene group; X is a linker selected from the group consisting of —CONH—, —NHCO—, —COO—, —OCO—, —CO—, —SO$_2$—, —SO$_3$—, —O—P(=O)(OH)—O—, and —O—P(OH)—O—; and Y is a colorant residue.

2. The lightfast colorant of claim 1, wherein said colorant residue Y is a remaining moiety of a dye or a pigment, and the moiety excludes the linker X that binds the colorant and the cinnamate derivative.

3. A lightfast ink composition comprising:
at least one lightfast colorant,
wherein the lightfast colorant is a cinnamate derivative of formula (1) below:

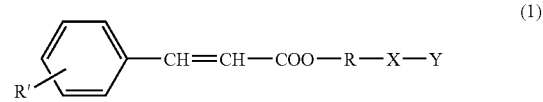

where R' is selected from the group consisting of a halogen atom, a nitro group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ oxycarbonylalkyl group, a substituted or unsubstituted $C_6$–$C_{18}$ aryl group, and a substituted or unsubstituted $C_7$–$C_{19}$ alkylaryl group; R is selected from the group consisting of a substituted or unsubstituted $C_1$–$C_{30}$ alkylene group, a substituted or unsubstituted $C_1$–$C_{30}$ alkenylene group, a substituted or unsubstituted $C_1$–$C_{30}$ alkynylene group, a substituted or unsubstituted $C_1$–$C_{30}$ heteroalkylene group, a substituted or unsubstituted $C_6$–$C_{30}$ arylene group, a substituted or unsubstituted $C_7$–$C_{30}$ arylenealkylene group, a substituted or unsubstituted heteroarylene group, and a substituted or unsubstituted $C_4$–$C_{30}$ heteroarylenealkylene group; X is a linker selected from the group consisting of —CONH—, —NHCO—, —COO—, —OCO—, —CO—, —SO$_2$—, —SO$_3$—, —O—P(=O)(OH)—O—, and —O—P(OH)—O—; and Y is a colorant residue; and
an aqueous medium.

4. The lightfast ink composition of claim 3, wherein an amount of the lightfast colorant is in a range of 1–20 parts by weight with respect to 100 parts by weight of the ink composition.

5. A lightfast ink composition comprising:
a colorant;
at least one lightfast colorant,
wherein the lightfast colorant is a cinnamate derivative of formula (1) below:

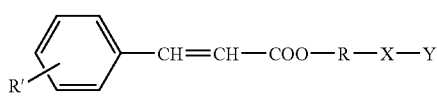

(1)

where R' is selected from the group consisting of a halogen atom, a nitro group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ oxycarbonylalkyl group, a substituted or unsubstituted $C_6$–$C_{18}$ aryl group, and a substituted or unsubstituted $C_7$–$C_{19}$ alkylaryl group; R is selected from the group consisting of a substituted or unsubstituted $C_1$–$C_{30}$ alkylene group, a substituted or unsubstituted $C_1$–$C_{30}$ alkenylene group, a substituted or unsubstituted $C_1$–$C_{30}$ alkynylene group, a substituted or unsubstituted $C_1$–$C_{30}$ heteroalkylene group, a substituted or unsubstituted $C_6$–$C_{30}$ arylene group, a substituted or unsubstituted $C_7$–$C_{30}$ arylenealkylene group, a substituted or unsubstituted heteroarylene group, and a substituted or unsubstituted $C_4$–$C_{30}$ heteroarylenealkylene group; X is a linker selected from the group consisting of —CONH—, —NHCO—, —COO—, —OCO—, —CO—, —SO$_2$—, —SO$_3$, —O—P(=O)(OH)—O—, and —O—P(OH)—O—; and Y is a colorant residue; and
an aqueous medium.

6. The lightfast ink composition of claim 5, wherein an amount of the colorant is in a range of 1–15 parts by weight, an amount of the lightfast colorant is in a range of 1–15 parts by weight, and a total amount of the colorant and the lightfast colorant is in a range of 2–20 parts by weight, with respect to 100 parts by weight of the lightfast ink composition.

7. The lightfast ink composition of claim 3, wherein the aqueous medium is one of: water and a mixture of 5–10% by weight of an organic solvent and 50–95% by weight of water.

8. The lightfast ink composition of claim 7, wherein the organic solvent is selected from the group consisting of methyl alcohol, ethyl alcohol, n-propyl alcohol, isopropyl alcohol, n-butyl alcohol, sec-butyl alcohol, t-butyl alcohol, isobutyl alcohol, acetone, methylethyl ketone, diethyl ketone, diacetone alcohol, methyl acetate, ethyl acetate, ethyl lactate, ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate, trimethylolpropane ethoxylate, ethylene glycol monomethyl ether, ethylene glycol monoethyl ether, diethylene glycol methyl ether, diethylene glycol ethyl ether, triethylene glycol monomethyl ether, triethylene glycol monoethyl ether, 2-pyrrolidone, N-methyl-2-pyrrolidone, dimethyl sulfoxide, tetramethylene sulfone, and thioglycol.

9. The lightfast ink composition of claim 3, further comprising at least one additive selected from the group consisting of a dispersant, a viscosity adjuster, a surfactant, a storage stabilizer, and a wetting agent, wherein an amount of the at least one additive is in a range of 0.5–40 parts by weight with respect to 100 parts by weight of the lightfast ink composition.

10. The lightfast ink composition of claim 5, wherein the aqueous medium is one of: water and a mixture of 5–10% by weight of an organic solvent and 50–95% by weight of water.

11. The lightfast ink composition of claim 10, wherein the organic solvent is selected from the group consisting of methyl alcohol, ethyl alcohol, n-propyl alcohol, isopropyl alcohol, n-butyl alcohol, sec-butyl alcohol, t-butyl alcohol, isobutyl alcohol, acetone, methylethyl ketone, diethyl ketone, diacetone alcohol, methyl acetate, ethyl acetate, ethyl lactate, ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate, trimethylolpropane ethoxylate, ethylene glycol monomethyl ether, ethylene glycol monoethyl ether, diethylene glycol methyl ether, diethylene glycol ethyl ether, triethylene glycol monomethyl ether, triethylene glycol monoethyl ether, 2-pyrrolidone, N-methyl-2-pyrrolidone, dimethyl sulfoxide, tetramethylene sulfone, and thioglycol.

12. The lightfast ink composition of claim 5, further comprising at least one additive selected from the group consisting of a dispersant, a viscosity adjuster, a surfactant, a storage stabilizer, and a wetting agent, wherein an amount of the at least one additive is in a range of 0.5–40 parts by weight with respect to 100 parts by weight of the lightfast ink composition.

* * * * *

UNITED STATES PATENT AND TRADEMARK OFFICE
CERTIFICATE OF CORRECTION

PATENT NO. : 7,173,114 B2 Page 1 of 1
APPLICATION NO. : 10/772286
DATED : February 6, 2007
INVENTOR(S) : Kyung-hoon Lee et al.

It is certified that error appears in the above-identified patent and that said Letters Patent is hereby corrected as shown below:

Column 25, Line 32, change "$C_1$—$C_2$oalkoxy" to --$C_1$—$C_{20}$alkoxy--.

Column 25, Line 47, change "—$SO_3$," to -- —$SO_3$—, --.

Signed and Sealed this

Fourth Day of March, 2008

JON W. DUDAS
*Director of the United States Patent and Trademark Office*